United States Patent [19]

Nivet

[11] 3,986,780

[45] Oct. 19, 1976

[54] CAPTIVE AND POSITIONED FIXING MEMBER

[75] Inventor: André Nivet, Beauchamp, France

[73] Assignee: ITW de France, Beauchamp, France

[22] Filed: June 2, 1975

[21] Appl. No.: 583,227

[30] Foreign Application Priority Data

June 4, 1974 France .............................. 74.19270

[52] U.S. Cl. .............................. 403/353; 403/252
[51] Int. Cl.² ...................... B25G 3/00; F16D 1/00
[58] Field of Search ........... 403/353, 361, 360, 252; 52/760, 758 D, 753 C

[56] References Cited
UNITED STATES PATENTS

| | | | |
|---|---|---|---|
| 1,102,079 | 6/1914 | Rizer.............................. | 403/353 X |
| 1,343,323 | 6/1920 | Kissinger....................... | 403/353 X |
| 1,398,020 | 11/1921 | Holley............................ | 403/353 X |
| 2,260,048 | 10/1941 | Newell........................... | 403/353 X |
| 2,915,762 | 12/1959 | Kivela............................ | 403/353 X |
| 3,017,217 | 1/1962 | Keating.......................... | 403/353 X |
| 3,388,614 | 6/1968 | Castelet........................ | 403/353 X |
| 3,806,124 | 4/1974 | Ippen et al..................... | 403/353 X |

Primary Examiner—Wayne L. Shedd
Attorney, Agent, or Firm—J. R. Halvorsen; R. W. Beart

[57] ABSTRACT

A fixing member on a support having a noncircular receiving orifice and having two flat faces, comprising two supporting portions coupled to each other by a rigid rod and spaced apart by a distance equal to the thickness of the support, the first portion having an apparent contour equal to that of the receiving orifice and having two axes of symmetry, the second portion comprising at least two locking bosses for the fixing member rigidly fixed to an elastic member, each of said bosses having an external contour the form of which is complementary to two diametrically opposite parts of the internal lateral face of said orifice, the assembly of said bosses having a plane of symmetry passing through the longitudinal axis, said plane of symmetry forming with the corresponding plane of symmetry of the contour of the first portion an angle equal to a fraction of a turn of predetermined value.

10 Claims, 8 Drawing Figures

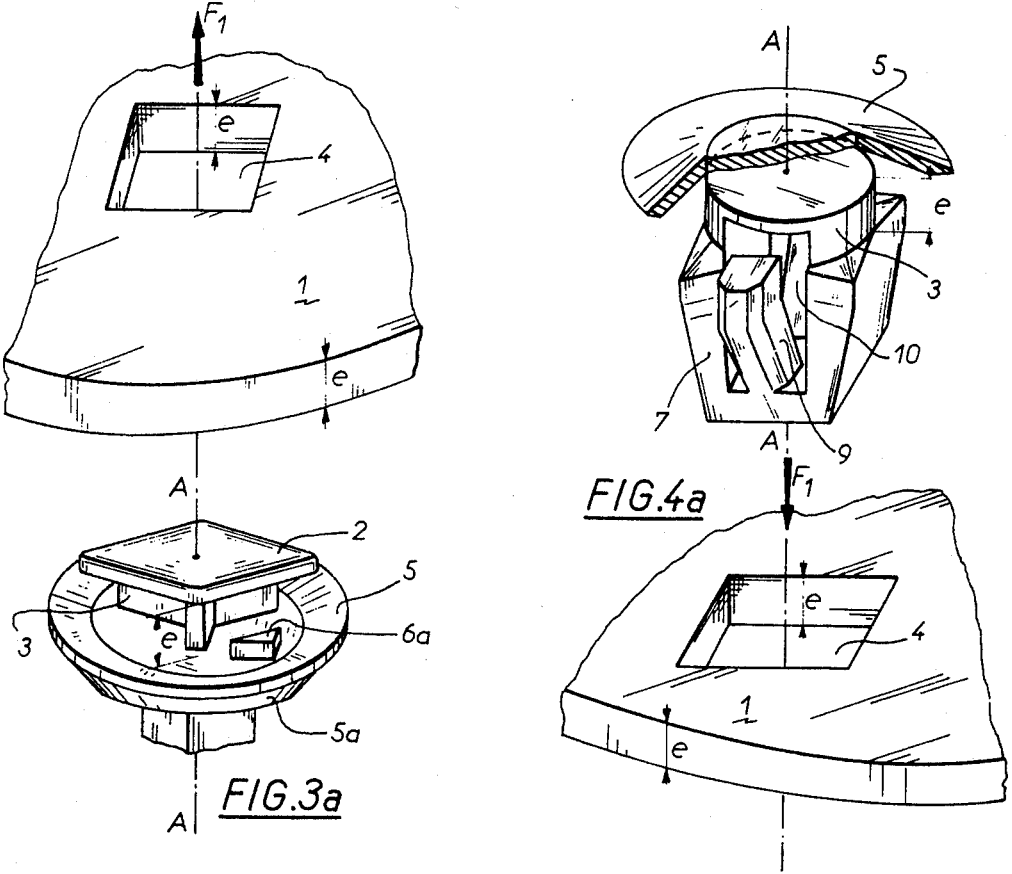

CAPTIVE AND POSITIONED FIXING MEMBER

The present invention relates to a fixing member for mounting on a support in a captive and positioned manner.

These fixing members, placed in position on the supports by means of an orifice of appropriate gape, previously formed in these latter and designed to receive them, when once fixed on the support have no longer any mobility along their axes, that is to say perpendicular to the plane of the panel; on the other hand, they most frequently remain movable for rotation about that axis when they are subjected to a couple of the same axis capable of overcoming the resistance due to friction applied between their various parts and those of the wall, and which is generally of low value.

In numerous cases, this results in a difficulty of putting the fixing member into its exact position in the opening of the support. In addition, in view of the play of the member in the opening, they are not perfectly captive.

The present invention obviates these disadvantages and provides a fixing member which is captive and positioned.

The fixing member according to the invention is essentially characterized by the fact that it comprises two supporting parts connected to each other by a rigid rod fixed to the said parts and coaxial with these latter, the length of which is equal to the thickness of the wall comprising the opening which receives it, each of the two said parts being provided with a flat face perpendicular to the longitudinal axis of the rod, the end portion of the rod having, perpendicularly to the longitudinal axis, an apparent contour equal to that of the receiving orifice, the said contour, other than circular, comprising at least two axes of symmetry, one of the two parts comprising at least two bosses for locking the fixing member rigidly on an elastic device, the said bosses each having an external contour, the shape of which is complementary to two diametrically opposite parts of the contour of the orifice, all the said bosses having a plane of symmetry passing through the longitudinal axis, the said plane of symmetry forming with the corresponding plane of symmetry of the contour of the end portion an angle equal to a fraction of a turn of pre-determined value.

According to other characteristic features:
the supporting part on the outer face is elastic and comprises the retaining bosses of the fixing member;
the supporting part on the inner face comprises at least one elastic device fixed to locking bosses against the internal lateral walls of the receiving orifice, and the said bosses project in the position of rest beyond the apparent contour of the said supporting part.

In accordance with a first form of embodiment, the receiving orifice for the fixing member has a rectangular contour; the supporting part on the inner face is constituted by a small rigid plate having a rectangular contour equal to that of the orifice. The supporting part on the outer face of the support is constituted by a small elastic plate having a circular contour, the said contour having a diameter at least equal to the greatest diagonal of the rectangular contour of the receiving orifice, and the said small plate comprises on its inner face at least two parallel rectilinear bosses of lengths equal to that of one of the sides of the said rectangular contour and at right angles to the sides of the same length of the rectangular contour of the supporting part on the inner face of the support, the two said bosses being symmetrical to each other with respect to the longitudinal axis of the member and spaced apart by a length equal to that of the other side of the rectangular contour.

According to a second form of embodiment, the receiving orifice for the fixing member has a contour of oblong shape, the supporting part on the inner face is constituted by a small rigid plate having an oblong contour equal to that of the orifice. The supporting part on the outer face is constituted by a small elastic plate of circular contour, the said contour having a diameter at least equal to the length of the major axis of the oblong contour of the receiving orifice, and the said plate comprises on its inner face at least two bosses in relief, symmetrical to each other with respect to the longitudinal plane of symmetry of the small plate of oblong contour and the external contours of which are the same as those of the oblong opening in which they are locked by a rotation of 90° about the longitudinal axis of the member.

According to a third form of embodiment, the receiving orifice for the fixing member has a square contour, the supporting part on the inner face is constituted by a small rigid plate of square contour equal to that of the receiving orifice, the supporting part on the outer face of the panel being constituted by a small circular elastic plate, the diameter of which is at least equal to the length of the diagonal of the square contour of the receiving orifice, and the said plate comprises on its inner face at least two bosses having the form of a right-angle prism, the base of which is an isosceles right-angle triangle, the function of which is to be housed in the diametrically opposite corners of the square of the opening by rotation through 45° about the longitudinal axis of the member.

According to a fourth form of embodiment, the opening receiving the fixing member has a square contour. The supporting part on the inner face is of cubic form, the length of the edge of the corresponding cube being equal to the length of the side of the square contour of the receiving orifice. The supporting part on the outer face is constituted by a small circular elastic cup, the diameter of which is at least equal to the length of the diagonal of the square receiving contour. The two supporting faces are connected together by a cylindrical portion, the diameter of which is equal to the square opening and, inside the cubic and cylindrical portion is formed an opening permitting the play of one or more locking lugs, the length of which is calculated so that they are housed with the desired shape in at least one of the corners of the square opening by rotation through 45° about the longitudinal axis of the member.

When once in position, the fixing member can carry out the most varied functions by virtue of the shapes which can be given to it, not only at one but at both of its extremities, such as for example, clamping collars, suspension hooks, receptable for screws or clips. The sole condition for being able to utilize the extremity which passes through the support is that the portion added can pass into the opening provided.

The member according to the invention can be manufactured from any appropriate synthetic material, produced by moulding.

In an advantageous manner, the small circular elastic supporting plate is provided on its edges with a sealing bead.

Other characteristic features and advantages of the present invention will be more clearly brought out in the description which follows below, reference being made to the accompanying drawings, in which:

FIGS. 3a and 3b are perspective views of a third form of embodiment of the fixing device according to the invention, respectively before and after its fixing on the support; and FIGS. 4a and 4b are perspective views of a fourth form of embodiment of the fixing device according to the invention, respectively before and after its fixing on the support.

In these drawings, the same reference numbers have been given to the same parts.

Figure 1A:
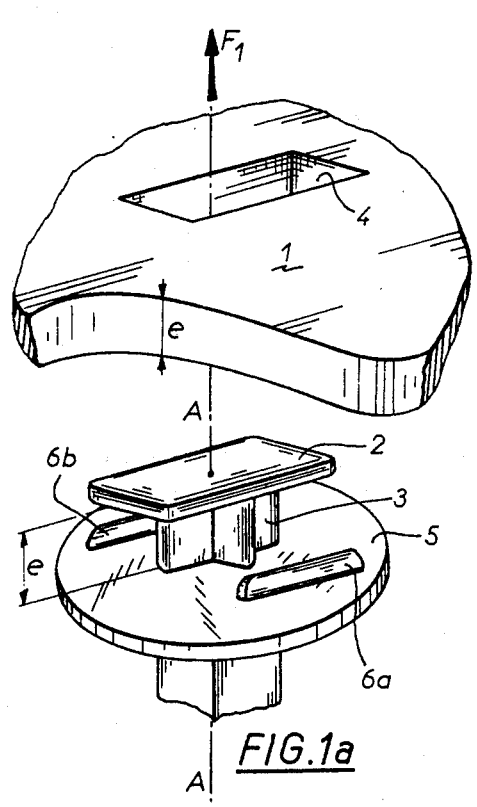
FIGS. 1a and 1b are perspective views of a first form of embodiment of the fixing device according to the invention, respectively before and after its fixing on the support.
Figure 1B:
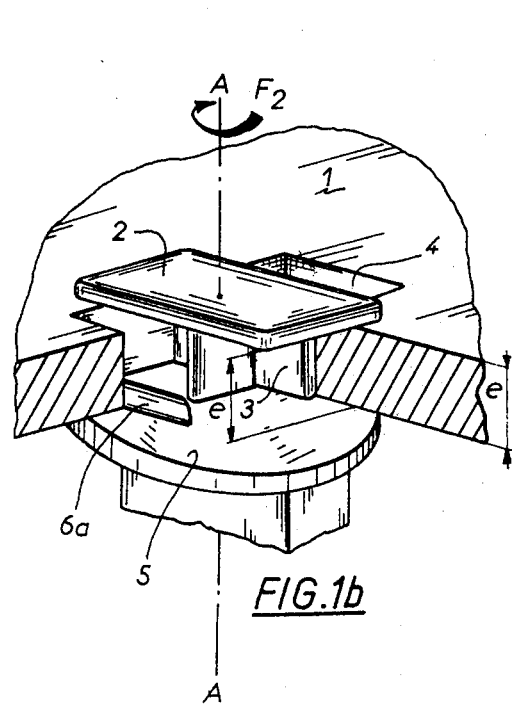

Referring first to FIGS. 1a and 1b, the fixing member is mounted on a support 1 and comprises, according to a first form of embodiment of the invention, on the one hand a supporting part 2 of rectangular shape, placed at the extremity of a rod 3, its plane being perpendicular to the longitudinal axis A—A of the said rod, its contour having the shape of an orifice 4, also rectangular with a contour equal to that of the plate formed in the support 1 over its entire thickness $e$, and on the other hand a supporting circular elastic member 5, the axis of which coincides with that of the rod 3 and the diameter of which is at least equal to the length of the diagonal of the rectangular orifice of the panel, the distance separating the flat opposite faces of the small rectangular plate 2 and the small circular plate 5, hereinafter termed the inner faces, being equal to the thickness $e$ of the support 1.

The small circular plate 5 is provided on its inner face with two rectilinear bosses 6a and 6b, parallel to each other, the length of which is equal to that of one of the sides of the rectangular contour of the orifice 4 formed in the panel 1, for example the small side, as shown in FIGS. 1a and 1b.

These two rectilinear bosses are arranged in such manner that in plan they are angularly displaced by 90° with respect to the small sides of the small rectangular plate 2, so that if the assembly thus constituted is rotated through an angle of 90° in either direction around its longitudinal axis A—A, the outer edges of the bosses 6a and 6b come to occupy in plan the position of the small sides of the rectangular contour of the said small plate 2.

If the length of the bosses were chosen equal to that of the large sides of this same rectangular contour, the said bosses would be angularly displaced in plan by 90° with respect to the small sides of the said rectangular contour.

Whereas the small rectangular plate 2 is as rigid as possible, the thinner small circular plate is elastically deformable and can in particular be incurved around a diametral line parallel to the common direction of the bosses.

The outer face of the small circular plate is extended by a portion of known shape with which it is fixed (not shown in the drawing) which, as stated above, ensures a fixing function. Similarly, the outer face of the small rectangular plate 2 may also be extended by a portion of known shape, provided that this portion is able to pass into the opening 4.

The assembly thus described is placed in position and fixed to the support in the following manner. The small rectangular plate 2 is first introduced into the orifice 4 of the same rectangular contour (or possibly having dimensions very slightly less in order to facilitate this introduction) until the bosses 6a and 6b (in relief on the inner face and having a thickness less than the thickness $e$ of the support 1) come to be supported against the outer face of the support. An axial pressure is then applied in the direction of the arrow $F_1$ shown in FIG. 1a, so as to bring the inner face of the small rectangular plate 2 into the plane of the inner face of the support, which is possible due to the elasticity of the support, the small circular plate 2 which becomes incurved.

At the same time, the whole of the device is rotated about its longitudinal axis, for example in the direction of the arrow $F_2$ shown in FIG. 1b (or in the opposite direction) through an angle of 90° or a quarter of a turn, which has the effect of bringing the two bosses which up to that time were supported against the outer face of the support, respectively opposite the small sides of the rectangular opening of this latter inside which opening it then becomes housed, the small circular plate 2 which was elastically deformed resuming its normal initial shape and becoming supported by its whole surface against the outer face of the support, while on the one hand the outer edges of the bosses are in contact with the corresponding walls of the small sides of the rectangular orifice, and on the other hand the small rectangular plate 2 orientated at 90° with respect to the rectangular orifice of the support comes into contact with the inner face of this latter.

In this way, the device described above cannot any longer move and due to this fact, the fixing member according to the invention constantly occupies the fixed position with respect to the said support, irrespective of the forces to which it may be subjected.

Figure 2A:
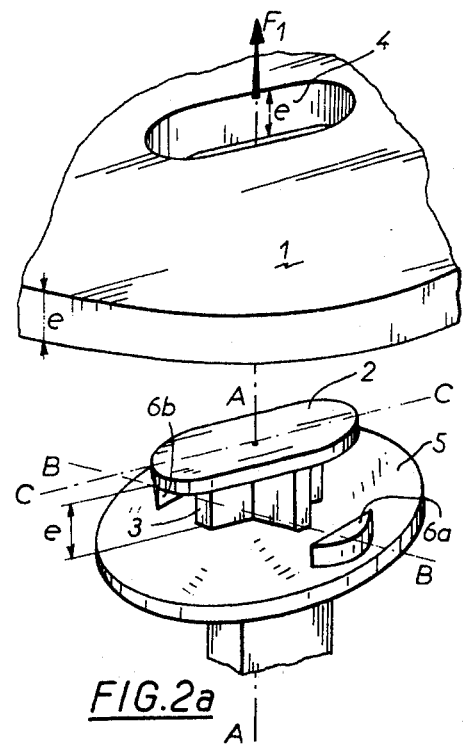
FIGS. 2a and 2b are perspective views of a second form of embodiment of the fixing device according to the invention, respectively before and after its fixing on the support.
Figure 2B:
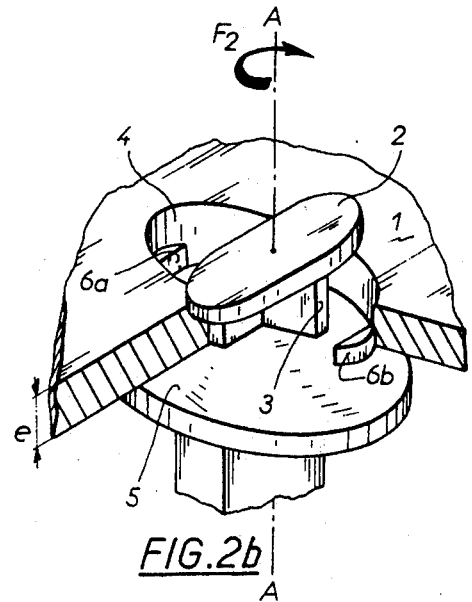

The fixing member according to the invention may be produced in ways other than that described above. Thus, as shown in FIGS. 2a and 2b, the orifice 4 may have an oblong shape having a longitudinal axis of symmetry and a transverse axis of symmetry. In this case, the small end-plate 2 of the fixing member has a contour with the oblong shape of the orifice 4, and the two bosses in relief form on the inner face of the small circular plate 5 over a thickness less than the thickness $e$ of the support, have the same outer contour as the extremities of the oblong opening.

Under these conditions, it is clear that if, as with the form of embodiment first described, on the one hand the oblong plate 2 is introduced into the oblong orifice 4 of the support 1 in the direction of the arrow $F_1$ (see FIG. 2a), the bosses are supported against the outer face of the support and produce the elastic bending of the circular plate 5.

The whole device is then subjected to a rotation of 90° about its longitudinal axis A—A, for example in the direction of the arrow $F_2$ (see FIG. 2b), the bosses 6a and 6b, due to their arrangement and shape such as described above, become opposite the circular extremities of the oblong orifice 4 and, by virtue of the elasticity of the small circular plate 2, then under tension, are bent back inside the orifice in which they become housed, locking the member in position.

According to a third form of embodiment shown in FIGS. 3a and 3b, the fixing device comprises the same essential parts as in the two forms of embodiment described above, the only differences residing in the shape of the said parts.

Thus, this device, which necessitates a square orifice 4 for its fixing, comprises a square end-plate 2 of shape complementary to that of the said orifice, a small circular plate 5 carrying two bosses in relief 6a and 6b, having a thickness less than the thickness e of the support, and in the form of a rectangular prism thus having the same external contour as the corners of the square.

In order to place a fixing device of this kind in position, the operation is carried out in the same way as with the previous embodiment, that is to say by introducing the small square plate 2 in the square orifice 4 in the direction of the arrow $F_1$ and applying a thrust intended to force the bosses 6a and 6b against the outer face of the panel, which causes bending of the circular elastic plate 5.

The placing in position is effected by rotating the assembly about its longitudinal axis A—A, not as in the previous cases through an angle of 90°, but through an angle of 45° only so as to cause the bending-back of the bosses 6a and 6b into the corners of the orifice 4 of the support.

According to a fourth form of embodiment, shown in FIGS. 4a and 4b, the fixing device is differently designed for an orifice 4 of square form. It comprises a portion 7 which may be of generally cubic shape but more advantageously in the form of a uniform truncated pyramid with square bases, having a small base constituting the end-base and the large base having the form complementary to that of the orifice 4.

The portion 7 is extended by a circular cylindrical part 3, the diameter of which is equal to the length of the side of the square forming the contour of the orifice 4, and the height of which is equal to the thickness e of the support. Over a portion of the height of the assembly constituted by the frusto-pyramidal member and the cylindrical portion 3 is formed an orifice 8 which opens on to two opposite lateral faces of the portion 7.

The orifice 8 constitutes the housing for at least one and preferably two elastic locking lugs 9 and 10, each constituted by an elastic arm 8a and 10a, fixed by their bases on the transverse face of the orifice 8 adjacent the small base of the member 7 and terminating in the parts 9a and 10a of the same external contour as the corners of the square and at a sufficient height to be free in the thickness e of the square 4 of the support. The fixing member is terminated by an elastic cup 5 which permits the mounting to be completed.

The above fixing device is placed in position in the following manner: the frusto-pyramidal member 7 is introduced into the orifice 4. A pressure is then applied in the direction of the arrow $F_1$, that is to say directed along the longitudinal axis A—A, which has the effect of causing the two elastic arms to come closer together towards the interior of the orifice 8, the flat face of the large square base of the member 7 in the form of a truncated pyramid coming into coincidence with the flat inner face of the support.

The pressure continues to be applied on the cup 5 which becomes elastically deformed and enables the two locking lugs to become placed under the inner face of the support of thickness e. It is then only necessary to rotate the whole of the fixing member through one-eighth of a turn, that is to say through an angle of 45°, for example in the direction of the arrow $F_2$ of FIG. 4b in order that faces of the arms 9a and 10a of the same external contour as the sides of the square come opposite two diagonally opposite corners of the square. By releasing the pressure on the elastic cup, the two locking lugs are brought into position in the square. When this is effected, the fixing member is locked in position. In order to facilitate rotation of the large square base of the member 7 on the inner face of the panel, it may advantageously be given a slight taper.

The members according to the invention occupy a fixed and pre-orientated position with respect to the support on which they are fixed. The circular elastic head 5 must of course have a diameter sufficient to cover the opening, which then ensures fluid-tightness in all cases where this is necessary.

When the fluid-tightness requires to be particularly perfect, the edge of the said small plate on its outer face may be reinforced by a sealing bead, as shown at 5a in FIGS. 3a and 3b, the part constituting the small plate then having the form of a cup.

There have been described above, by way of examples, four different forms of embodiment of the fixing device according to the invention and corresponding respectively to rectangular, oblong or square forms of the contour of the orifice 4 formed in the support, but it is clear that the contours of these orifices and in consequence that of the small supporting plates 5 may have different shapes from those preceding. It is only necessary to calculate the fraction of a turn necessary to cause the bosses to coincide in the said polygonal figure retained.

It will of course be understood that the present invention has only been described and illustrated by way of preferred example, and that technical equivalent means may be added to its constituent parts without thereby departing from the scope of the present invention as defined in the appended claims.

I claim:

1. A rotatable one-piece plastic fixing member intended for use in a noncircular apertured support panel which includes two flat surfaces facing in opposite directions, said fixing member comprising two supporting portions coupled to each other by a rigid rod and spaced apart by a distance equal to the thickness of the support panel, the first supporting portion which forms the end portion of said rod engaging against the first surface of the support and having, perpendicular to the longitudinal axis of said fixing member, a noncircular contour complementary to that of the noncircular aperture of the panel, said noncircular contour including at least two axes of symmetry, the second supporting portion which engages the second surface of the support, said fixing member further having at least two resiliently mounted locking bosses, said bosses each having an external contour the form of which is complementary to two diametrically opposite parts of the internal lateral face of said aperture, the disposition of said bosses having a plane of symmetry passing through the longitudinal axis of said fixing member, said plane of symmetry forming with the corresponding plane of symmetry of the contour of the first supporting portion at an angle equal to a fraction of a turn of pre-determined value.

2. A fixing member as claimed in claim 1, in which the second supporting portion engaging the said second surface of said support is elastic and carries the locking bosses of said fixing member.

3. A fixing member as claimed in claim 1, in which the first supporting portion engaging the first surface of said support comprises at least one elastic locking lug that is resiliently fixed adjacent the locking bosses and adapted to engage the internal lateral walls of the receiving aperture, and that after rotation of the fixing member the said bosses in the state of rest project outside the contour of the aperture of said supporting member and said elastic locking lug engages a corner of said aperture.

4. A fixing member as claimed in claim 2 in which the receiving orifice has a rectangular contour and that the first supporting member engaging the first surface is constituted by a small rigid plate having a rectangular contour equal to that of said aperture, that the second supporting member engaging the second surface of said support is constituted by a small elastic plate of circular contour, said plate having a diameter at least equal to the largest diagonal of the rectangular contour of said receiving aperture, and that said small elastic plate carries on its internal face two parallel rectilinear bosses of lengths equal to that of one of the sides of said rectangular contour, and disposed in such manner that their placing in the locking position in said aperture is effected by a rotation of 90° about the axis of the coupling rod of the two portions.

5. A fixing member as claimed in claim 2, in which the receiving aperture of said support has a contour of oblong shape, that the first supporting portion is constituted by a small rigid plate having an oblong contour equal to that of said aperture, that the second supporting portion is constituted by a small elastic plate of circular contour, said plate having a diameter at least equal to the length of the major axis of the oblong contour of the receiving aperture of said support, and said small elastic plate carries on its internal face two curved bosses which in relief are symmetrical to each other and fall in a plane perpendicular to the longitudinal plane of symmetry of the small plate of oblong contour, the external curved contours of the bosses and curved ends of the rigid plate are inscribed in an imaginary straight cylinder, the oblong spacing of said bosses being equal to the oblong contour of said small plate, and said aperture and locking is obtained by rotation of 90° about the longitudinal axis of said member, after the oblong contour of said small plate has been axially telescoped through said aperture.

6. A fixing member as claimed in claim 2, in which the receiving aperture of the support with which it co-operates has a square contour, that the first supporting portion is constituted by a small rigid plate of square contour complimentary to that of said receiving aperture, the second supporting portion engaging the second surface of said support being constituted by a small circular plate the diameter of which is at least equal to the length of the diagonal of the square contour of said receiving aperture, and that said small plate carries on its internal face facing the support, two bosses symmetrical to each other with respect to a diagonal plane of symmetry of said small plate of square contour, each boss having the form of a right-angle prism the base of which is an isosceles right-angle triangle having the same external contour as the corners of the square aperture and disposed in such manner that their placing in the locking position in the corners of said aperture is effected by rotation through 45° about the axis of the coupling rod of the two supporting portions.

7. A fixing member as claimed in claim 3, in which the receiving aperture has a square contour, the said first supporting member facing the internal first surface of the support is of cubic form, the cube being complimentary to the square contour of the receiving aperture, that the second supporting member on the external face of the support is constituted by a circular elastic dished head, the diameter of said head being at least equal to the length of the diagonal of the square contour of the receiving aperture, that the coupling rod of the two said supporting members is in the form of a straight circular cylinder having a diameter which is substantially equal to the length of the side of the square contour of the receiving aperture, that a receiving cavity for at least one locking lug is formed parallel to the longitudinal axis in the cubic member and in the cylindrical rod over a part of its length, said locking lug comprising an elastic arm having its axis arranged in an axial plane of symmetry of the cubic first supporting member perpendicular to its sides and inclined on the longitudinal axis of symmetry, said elastic arm constituting the locking member of the fixing member in the aperture and being arranged in such manner that the locking is obtained by a rotation through 45° after telescopic association of said cubic first supporting member through said aperture.

8. A fixing member as claimed in claim 1, in which the second supporting portion on the external second surface of said support includes an object-carrier extremity.

9. A fixing member as claimed in claim 1, in which the first supporting portion on the internal first surface of said support has an axial extension in the form of an object-carrier extremity, the contour of which extremity can pass through the contour of the aperture of said support.

10. A fixing member as claimed in claim 1, in which the second supporting portion includes a small circular supporting plate on the external second surface of the support panel is provided on its edges with a fluid-tight sealing joint.

* * * * *